United States Patent
Hasegawa et al.

(10) Patent No.: US 10,513,575 B2
(45) Date of Patent: Dec. 24, 2019

(54) FOAM POLYURETHANE MATERIAL, MOLDED ARTICLE, AND METHOD FOR PRODUCING FOAM POLYURETHANE MATERIAL

(71) Applicant: MITSUI CHEMICALS, INC., Tokyo (JP)

(72) Inventors: Daisuke Hasegawa, Yokohama (JP); Masakazu Kageoka, Kawasaki (JP); Goro Kuwamura, Chiba (JP); Satoshi Yamasaki, Chiba (JP)

(73) Assignee: MITSUI CHEMICALS, INC., Tokyo (JP)

( * ) Notice: Subject to any disclaimer, the term of this patent is extended or adjusted under 35 U.S.C. 154(b) by 0 days.

(21) Appl. No.: 15/752,762

(22) PCT Filed: Aug. 10, 2016

(86) PCT No.: PCT/JP2016/073555
§ 371 (c)(1),
(2) Date: Feb. 14, 2018

(87) PCT Pub. No.: WO2017/030065
PCT Pub. Date: Feb. 23, 2017

(65) Prior Publication Data
US 2018/0244885 A1    Aug. 30, 2018

(30) Foreign Application Priority Data

Aug. 18, 2015  (JP) ................. 2015-161105

(51) Int. Cl.
| | | |
|---|---|---|
| C08G 18/10 | (2006.01) | |
| C08J 9/00 | (2006.01) | |
| C08G 18/32 | (2006.01) | |
| C08G 18/75 | (2006.01) | |
| C08G 101/00 | (2006.01) | |
| C08L 75/04 | (2006.01) | |
| C08G 18/48 | (2006.01) | |
| C08G 18/76 | (2006.01) | |
| C08G 18/24 | (2006.01) | |

(52) U.S. Cl.
CPC ......... *C08G 18/10* (2013.01); *C08G 18/3203* (2013.01); *C08G 18/3275* (2013.01); *C08G 18/4825* (2013.01); *C08G 18/4837* (2013.01); *C08G 18/4854* (2013.01); *C08G 18/755* (2013.01); *C08G 18/757* (2013.01); *C08G 18/7642* (2013.01); *C08G 18/7671* (2013.01); *C08J 9/00* (2013.01); *C08L 75/04* (2013.01); *C08G 18/246* (2013.01); *C08G 2101/0033* (2013.01); *C08G 2101/0058* (2013.01); *C08G 2101/0083* (2013.01)

(58) Field of Classification Search
CPC ............ C08G 18/10–12; C08G 18/722; C08G 18/751; C08G 18/75–755; C08G 18/757; C08G 18/7642
See application file for complete search history.

(56) References Cited

U.S. PATENT DOCUMENTS

| | | | | |
|---|---|---|---|---|
| 4,627,178 A * | 12/1986 | Sullivan | ............... | B29D 35/122 |
| | | | | 12/146 BR |
| 5,650,452 A | 7/1997 | Thompson | | |
| 6,022,903 A | 2/2000 | Younes | | |
| 6,197,839 B1 | 3/2001 | Genz et al. | | |
| 6,376,567 B1 * | 4/2002 | Werner | ................. | C08G 18/10 |
| | | | | 521/130 |
| 2006/0079589 A1 | 4/2006 | Niwa | | |
| 2009/0082477 A1 * | 3/2009 | Speas | .................... | C08G 18/10 |
| | | | | 521/94 |
| 2010/0216905 A1 | 8/2010 | Hasegawa | | |

FOREIGN PATENT DOCUMENTS

| | | | |
|---|---|---|---|
| CN | 1156153 A | 8/1997 | |
| CN | 1306549 A | 8/2001 | |
| CN | 1315973 A | 10/2001 | |
| JP | S57067624 A | 4/1982 | |
| JP | H06220155 A | 8/1994 | |
| JP | H07309827 A | 11/1995 | |
| JP | H10501830 A | 2/1998 | |
| JP | S64048815 A | 2/1998 | |
| JP | 2001002752 A | 1/2001 | |
| JP | 2002030129 A | 1/2002 | |
| JP | 2003212835 A | 7/2003 | |
| JP | 2003277459 A | 10/2003 | |
| JP | 2004216880 A | 8/2004 | |
| JP | 2004244349 A | 9/2004 | |
| JP | 2004359950 A | 12/2004 | |
| JP | 2009149848 A | 7/2009 | |
| JP | 2011006382 A | 1/2011 | |
| JP | 2011140618 A | 7/2011 | |
| JP | 2011184637 A | 9/2011 | |
| JP | 2013076076 A | 4/2013 | |
| JP | 5675011 B | 2/2015 | |
| WO | 199534591 A1 | 12/1995 | |
| WO | WO-9534591 A1 * | 12/1995 | ............. C08G 18/10 |
| WO | 2009051114 A1 | 4/2009 | |
| WO | 2013100633 A1 | 7/2013 | |

OTHER PUBLICATIONS

Lexorez 1931-50 Information. Inforchems Inc. http://www.infochems.co.kr/chemdb/product_content.asp?product_id=45331. As viewed on Sep. 18, 2018. (Year: 2018).*
International Search Report dated Oct. 25, 2016 filled in PCT/JP2016/073555.
Notification of Reasons for Refusal of Japanese patent application No. 2016-571434 dated Feb. 7, 2017; English Translation.
Decision to Grant a Patent of Japanese patent application No. 2016-571434 dated May 23, 2017; English Translation.
International Preliminary Report on Patentability dated Oct. 25, 2016 filed in PCT/JP2016/073555, total 11 pages.
Extended European Search Report dated Nov. 30, 2018 for the corresponding European Patent Application No. 16837055.9.

* cited by examiner

*Primary Examiner* — Stephen E Rieth

(74) *Attorney, Agent, or Firm* — Rankin, Hill & Clark LLP

(57) ABSTRACT

A foam polyurethane material is a reaction-foaming-product of a composition containing a polyisocyanate (a), an isocyanate-terminated prepolymer (b) containing 0.3 mass % or more and less than 5 mass % of an isocyanate group, a polyol (c), and a catalyst.

11 Claims, 3 Drawing Sheets

FOAM POLYURETHANE MATERIAL, MOLDED ARTICLE, AND METHOD FOR PRODUCING FOAM POLYURETHANE MATERIAL

TECHNICAL FIELD

The present invention relates to a foam polyurethane material, a molded article, and a method for producing a foam polyurethane material.

BACKGROUND ART

Conventionally, as a foam polyurethane material, for example, Patent Document 1 below has proposed a microcellular polyurethane elastomer produced by allowing a polyisocyanate compound to react with polyol, having an overall density of 100 kg/m$^3$ or more, and having an overall density, a compression set, and a cell diameter on skin surface in specific relation.

Furthermore, as the foam polyurethane material, for example, Patent Document 2 below has proposed a polyurethane foam produced from materials including polyisocyanate including bis(isocyanatomethyl) cyclohexane, polyol, a blowing agent, and a catalyst.

CITATION LIST

Patent Document

Patent Document 1: Japanese Unexamined Patent Publication No. 2002-30129
Patent Document 2: Japanese Unexamined Patent Publication No. 2009-149848

SUMMARY OF THE INVENTION

Problem to be Solved by the Invention

However, markets demand more and more of achieving various physical properties such as lightweight and resilience at high level and at the same time.

To be specific, lighter weight and higher impact resilience (resilience by ball rebound) may be required in foam polyurethane material such as the above-described microcellular polyurethane elastomer of patent document 1 and the above-described polyurethane foam of patent document 2.

Lightweight and various physical properties such as resilience tend to trade off, and with the above-described conventional technique, achieving both properties are limited. This was assumed that higher expansion rate for lightweight causes disadvantages such as interconnection of cells together, which generates relatively large cells, and concentration of stress on that portion.

An object of the present invention is to provide a foam polyurethane material having lightweight and high impact resilience, a molded article of the foam polyurethane material, and a method for producing the foam polyurethane material.

Means for Solving the Problem

The inventors of the present invention have examined and found out that polyurethane in which an isocyanate-terminated prepolymer having an isocyanate group content in a specific range is used achieves foam with relatively small cell in a large number, and that the above-described problem can be solved, and completed the present invention below.

[1] first invention of the present invention is a foam polyurethane material, wherein the foam polyurethane material is a reaction-foaming-product of a composition containing a polyisocyanate (a), an isocyanate-terminated prepolymer (b) containing 0.3 mass % or more and less than 5 mass % of an isocyanate group, a polyol (c), and a catalyst.

[2] first invention of the present invention includes the foam polyurethane material of the above-described [1], wherein the isocyanate-terminated prepolymer (b) contains 0.4 mass % or more and 3.5 mass % or less of the isocyanate group.

[3] first invention of the present invention includes the foam polyurethane material of the above-described [1] or [2], wherein 1 mass % or more and 25 mass % or less of the isocyanate-terminated prepolymer (b) is contained in a total amount of the polyisocyanate (a) and the isocyanate-terminated prepolymer (b).

[4] first invention of the present invention includes the foam polyurethane material of any one of the above-described [1] to [3], wherein the isocyanate-terminated prepolymer (b) is a reaction product of a polyisocyanate (b-1) and a polyol (b-2), and the polyol (b-2) has a number average molecular weight of 1000 or more and 9000 or less.

[5] first invention of the present invention includes the foam polyurethane material of any one of the above-described [1] to [4], wherein the isocyanate-terminated prepolymer (b) is a reaction product of a polyisocyanate (b-1) and a polyol (b-2), and the polyisocyanate (b-1) is bis(isocyanatomethyl) cyclohexane.

[6] first invention of the present invention includes the foam polyurethane material of any one of the above-described [1] to [5], wherein the polyisocyanate (a) is at least one selected from the group consisting of aliphatic polyisocyanate, alicyclic polyisocyanate, and araliphatic polyisocyanate.

[7] first invention of the present invention include the foam polyurethane material of any one of the above-described [1] to [6], wherein the foam polyurethane material has an impact resilience measured in accordance with JIS K6400-3 (2012) of 65% or more.

[8] second invention of the present invention includes a molded article made of the foam polyurethane material of any one of the above-described [1] to [7].

[9] second invention of the present invention includes the molded article of the above-described [8], which is used for a shoe midsole.

[10] third invention of the present invention includes a method for producing any one of the foam polyurethane material of the above-described [1] to [7], the method comprising allowing a composition to react and foam, the composition containing the polyisocyanate (a), the isocyanate-terminated prepolymer (b), the polyol (c), and the catalyst.

Effects of the Invention

The foam polyurethane material of the present invention is produced by allowing a composition containing an isocyanate-terminated prepolymer (b) containing 0.3 mass % or more and less than 5 mass % of an isocyanate group to react and to foam.

Therefore, when the composition is allowed to react and foam, the isocyanate-terminated prepolymer (b) is allowed to react with polyol (c), which allows for improvement in the speed of increase in viscosity of the composition in the process of the reaction. In this manner, cell unification in the composition in the process of reaction can be suppressed.

As a result, microcells can be increased inside the foam polyurethane material, and therefore lightweight and high impact resilience can be achieved.

The molded article of the present invention is made of the above-described foam polyurethane material.

Therefore, lightweight and high impact resilience can be achieved.

The method for producing a foam polyurethane material of the present invention can produce a foam polyurethane material having lightweight and high impact resilience.

DESCRIPTION OF EMBODIMENTS

Figure 1:
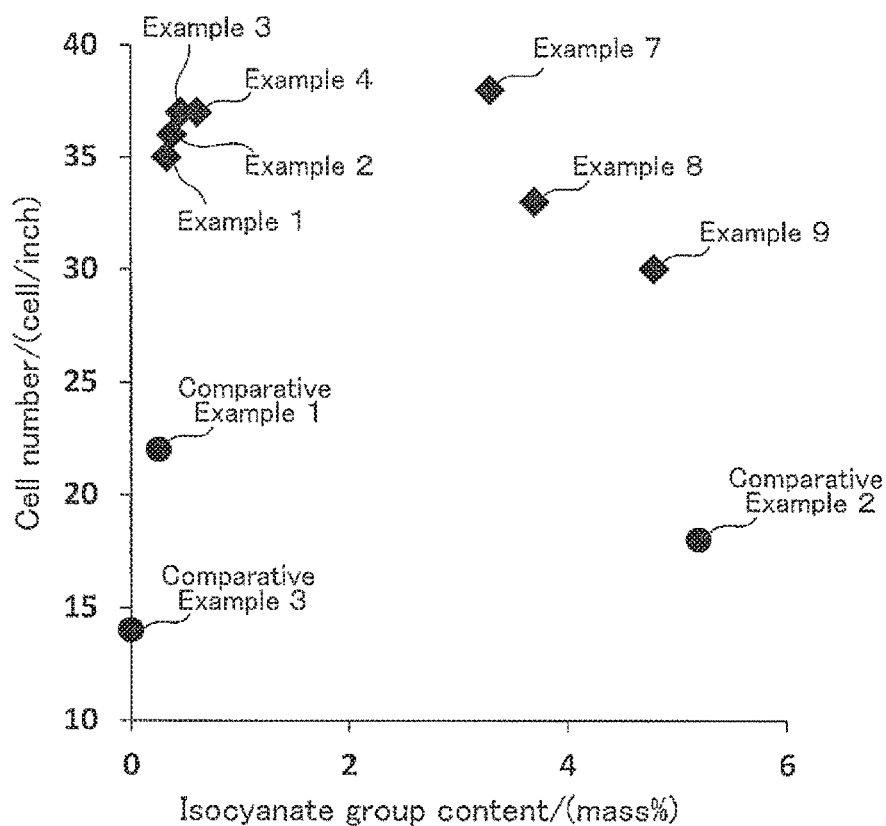
FIG. 1 is a correlation diagram showing correlation between the isocyanate group content of the isocyanate-terminated prepolymer (b) and the number of the cells per unit length (1 inch) of the obtained foam polyurethane material.

The foam polyurethane material of the present invention is a reaction-foaming-product obtained by allowing a composition (polyurethane composition) containing a polyisocyanate (a), an isocyanate-terminated prepolymer (b), a polyol (c), and a catalyst as essential components to react and foam.

Examples of the polyisocyanate (a) include aliphatic polyisocyanate, aromatic polyisocyanate, and araliphatic polyisocyanate.

Examples of the aliphatic polyisocyanate include aliphatic diisocyanate such as ethylenediisocyanate, trimethylenediisocyanate, tetramethylenediisocyanate, pentamethylenediisocyanate (PDI), hexamethylenediisocyanate (HDI), octamethylenediisocyanate, nonamethylenediisocyanate, 2,2'-dimethylpentanediisocyanate, 2,2,4-trimethylhexanediisocyanate, decamethylenediisocyanate, butenediisocyanate, 1,3-butadiene-1,4-diisocyanate, 2,4,4-trimethylhexamethvlenediisocyanate, 1,6,11-undecamethylenetriisocyanate, 1,3,6-hexamethylenetriisocyanate, 1,8-diisocyanate-4-isocyanatomethyloctane, 2,5,7-trimethyl-1,8-diisocyanate-5-isocyanatomethyloctane, bis(isocyanatoethyl) carbonate, bis(isocyanatoethyl) ether, 1,4-butylene glycol dipropyl-ether-ω,ω'-diisocyanate, lysineisocyanatomethylester, lysinetriisocyanate, 2-isocyanatoethyl-2,6-diisocyanatohexanoate, 2-isocyanatopropyl-2,6-diisocyanatehexanoate, bis(4-isocyanate-n-butylidene) pentaerythritol, and 2,6-diisocyanatemethylcaproate.

Aliphatic polyisocyanate include alicyclic polyisocyanate.

Examples of the alicyclic polyisocyanate include alicyclic diisocyanates such as isophoronediisocyanate (IPDI), 1,3- or 1,4-bis(isocyanatomethyl) cyclohexane or a mixture thereof (bis(isocyanatomethyl) cyclohexane ($H_6XDI$)), 4,4'-,2,4'- or 2,2'-dicyclohexylmethanediisocyanate or a mixture thereof ($H_{12}MDI$),1,3- or 1,4-cyclohexanediisocyanate or a mixture thereof, 1,3- or 1,4-bis(isocyanatoethyl) cyclohexane, methylcyclohexanediisocyanate, 2,2'-dimethyldicyclohexylmethanediisocyanate, dimer acid diisocyanate, 2,5- or 2,6-diisocyanatomethylbicyclo[2,2,2,1-heptane (NBDI), 2-isocyanatomethyl-2-(3-isocyanatopropyl)-5-isocvanatomethylbicyclo-[2,2,1]-heptane, 2-isocyanatomethyl-2-(3-isocyanatopropyl)-6-isocyanatomethylbicyclo-2,2,1]-heptane, 2-isocyanatomethyl-3-(3-isocyanatopropyl)-5-(2-isocyanatoethyl)-bicyclo-[2,2,1]-heptane, 2-isocyanatomethyl-3-(3-isocyanatopropyl)-6-(2-isocyanatoethyl)-bicyclo-[2,2,1]-heptane, 2-isocyanatomethyl-2-(3-isocyanatopropyl)-5-(2-isocyanatoethyl)-bicyclo-[2,2,1]-heptane, and 2-isocyanatomethyl-2-(3-isocyanatopropyl)-6-(2-isocyanatoethyl)-bicyclo-[2,2,1]-heptane.

Examples of the aromatic polyisocyanate include aromatic diisocyanates such as 2,4-tolylene diisocyanate and 2,6-tolylene diisocyanate, and a mixture of isomers of these tolylene diisocyanates (TDI), 4,4'-diphenylmethane diisocyanate, 2,4'-diphenylmethane diisocyanate, and 2,2'-diphenylmethane diisocyanate, and a mixture of arbitrary isomers of these diphenylmethane diisocyanates (MDI), toluidine diisocyanate (TODI), paraphenylene diisocyanate, and naphthalene diisocyanate (NDI).

Examples of the araliphatic polyisocyanate include araliphatic diisocyanates such as 1,3- or 1,4-xylylene diisocyanate or a mixture thereof (XDI), 1,3- or 1,4-tetramethylxylylene diisocyanate or a mixture thereof (TMXDI).

These polyisocyanates (a) can also be prepared as derivatives.

Examples of derivatives of the polyisocyanate (a) include multimers (e.g., dimer, trimer (e.g., isocyanurate-modified product, iminooxadiazinedione-modified product), pentamer, heptamer, etc.) of the polyisocyanate (a), allophanate-modified product (e.g., allophanate-modified product produced by reaction of the polyisocyanate (a) and a low-molecular-weight polyol to be described later, etc.), polyol modified product (e.g., polyol modified product (alcohol adduct) produced by reaction of the polyisocyanate (a) and a low-molecular-weight polyol to be described later, etc.), biuret-modified product (e.g., biuret-modified product produced by reaction of polyisocyanate (a), water, amines, etc.), urea-modified product (e.g., urea-modified product produced by reaction of the polyisocyanate (a) and diamine, etc.), oxadiazinetrione-modified product (e.g., oxadiazinetrione produced by reaction of the polyisocyanate (a) and carbon dioxide, etc.), and carbodiimide-modified product (carbodiimide-modified product produced by decarboxylation condensation reaction of the polyisocyanate (a), etc.), uretdione-modified product, and uretonimine-modified product.

The derivative of the polyisocyanate (a) also includes polymethylenepolyphenylenepolyisocyanate (crude MDI, polymeric MDI).

For the polyisocyanate (a), preferably, aliphatic polyisocyanate, alicyclic polyisocyanate, and araliphatic polyisocyanate are used, more preferably, alicyclic polyisocyanate is used, even more preferably 1,3- or 1,4-bis(isocyanatomethyl) cyclohexane, further preferably 1,4-bis(isocyanatomethyl) cyclohexane is used.

When 1,3- or 1,4-bis(isocyanatomethyl) cyclohexane is used as the polyisocyanate (a), preferably 1,3- or 1,4-bis(isocyanatomethyl) cyclohexane is used singly. That is, the polyisocyanate (a) preferably consists of 1,3- or 1,4-bis(isocyanatomethyl) cyclohexane.

1,4-bis(isocyanatomethyl) cyclohexane also include geometric isomers of cis-1,4-bis(isocyanatomethyl) cyclohexane and trans-1,4-bis(isocyanatomethyl) cyclohexane, and 1,4-bis(isocyanatomethyl) cyclohexane contains, for example, 50 mol % or more, preferably 70 mol % or more, more preferably 75 mol % or more, further preferably 80 mol % or more, and for example, 96 mol % or less, preferably 93 mol % or less of trans-1,4-bis(isocyanatomethyl) cyclohexane.

1,4-bis(isocyanatomethyl) cyclohexane is prepared in conformity with descriptions of, for example, international publication 2009/051114 or Japanese Unexamined Patent Publication No. 2011-140618. 1,4-bis(isocyanatomethyl) cyclohexane can also be produced by using commercially available amines or amine produced by the method described in Japanese Unexamined Patent Publication No. 2011-6382, and using, for example, the methods such as hot-cold two stage (direct method) or the salt-forming process described in Japanese Unexamined Patent Publication No. Hei 7-309827, or by non-phosgene method described in Japanese Unexamined Patent Publication No. 2004-244349 or Japanese Unexamined Patent Publication No. 2003-212835.

The isocyanate-terminated prepolymer (b) is a reaction product of polyisocyanate (b-1) and polyol (b-2).

For the polyisocyanate (b-1), the polyisocyanates given as examples of the above-described polyisocyanates (a) are used.

For the polyisocyanate (b-1), preferably, aliphatic polyisocyanate, alicyclic polyisocyanate, and araliphatic polyisocyanate are used, more preferably, alicyclic polyisocyanate is used, even more preferably 1,3- or 1,4-bis(isocyanatomethyl) cyclohexane, further preferably 1,4-bis(isocyanatomethyl) cyclohexane is used.

When 1,3- or 1,4-bis(isocyanatomethyl) cyclohexane is used as the polyisocyanate (b-1), preferably 1,3- or 1,4-bis(isocyanatomethyl) cyclohexane is used singly. That is, polyisocyanate (b-1) preferably consists of 1,3- or 1,4-bis(isocyanatomethyl) cyclohexane.

Examples of the polyol (b-2) include a high molecular weight polyol.

The high-molecular weight polyol is a compound having two or more hydroxyl groups and having a number average molecular weight of 300 or more and 20000 or less, and examples thereof include polyetherpolyol, polyesterpolyol, polycarbonatepolyol, polyurethane polyol, epoxypolyol, vegetable oil polyol, polyolefinpolyol, acrylic polyol, silicone polyol, fluorine polyol, and vinyl monomer-modified polyol.

Examples of the polyether polyol include polyoxyalkylene polyol and polytetramethylene ether polyol.

The polyoxyalkylene polyol is, for example, an addition polymerization product of alkylene oxide using a low-molecular-weight polyol or a low-molecular-weight polyamine as an initiator.

The low-molecular-weight polyol is a compound having two or more hydroxyl groups and having a number average molecular weight of 40 or more and less than 300, and examples thereof include dihydric alcohols such as ethylene glycol, propylene glycol, 1,3-propanediol, 1,4-butylene glycol, 1,3-butylene glycol, 1,2-butylene glycol, 1,5-pentanediol, 1,6-hexanediol, neopentyl glycol, 3-methyl-1,5-pentanediol, 2,2,2-trimethylpentanediol, 3,3-dimethylolheptane, alkane (C7 to 20) diol, 1,3- or 1,4-cyclohexanedimethanol and a mixture thereof, 1,3- or 1,4-cyclohexanediol and a mixture thereof, hydrogenated bisphenol A, 1,4-dihydroxy-2-butene, 2,6-dimethyl-1-octene-3,8-diol, bisphenol A, diethylene glycol, triethylene glycol, and dipropylene glycol; trihydric alcohols such as glycerin, trimethylolpropane, and triisopropanolamine; tetrahydric alcohols such as tetramethylolmethane (pentaerythritol) and diglycerin; pentahydric alcohols such as xylitol; hexahydric alcohols such as sorbitol, mannitol, allitol, iditol, dulcitol, altritol, inositol, and dipentaerythritol; heptahydric alcohols such as perseitol; and octahydric alcohols such as sucrose.

Examples of the low-molecular-weight polyamine include low-molecular-weight diamines such as ethylenediamine, 1,3-propane diamine, 1,3- or 1,4-butanediamine, 1,6-hexamethylenediamine, 1,4-cyclohexanediamine, 3-aminomethyl-3,5,5-trimethylcyclohexylamine (isophoronediamine), 4,4'-dicyclohexylmethanediamine, 2,5(2,6)-bis(aminomethyl) bicyclo[2.2.1]heptane, 1,3-bis(aminomethyl) cyclohexane, hydrazine, and o,m or p-tolylenediamine (TDA,OTD); low-molecular-weight triamines such as diethylenetriamine; and low-molecular-weight polyamines having four or more amino groups such as triethylenetetramine and tetraethylenepentamine.

These initiators may be used singly or in combination of two or more. For the initiator, preferably, a low-molecular-weight polyol is used.

Examples of the alkylene oxide include ethylene oxide (IUPAC name: oxirane), propyleneoxide (1,2-propyleneoxide (IUPAC name: methyl oxirane)), butyleneoxide (1,2-butyleneoxide (IUPAC name: ethyl oxirane), and 2,3-butyleneoxide (IUPAC name: 2,3-dimethyl oxirane)). These alkylene oxides may be used singly or in combination of two or more. Of these alkylene oxides, preferably, ethylene oxide and propyleneoxide are used.

For the polyoxyalkylene polyol, to be specific, polyalkylene oxides such as polyethylene glycol, polypropylene glycol, and polyethylene polypropylene glycol (random or block copolymer) are used.

For the polyoxyalkylene polyol, preferably, polyoxyalkylene polyol that was subjected to polymerization reaction with a catalyst that has little propyleneoxide side reaction is used, and such polyol is produced by, for example, a known phosphazene catalyst or double metal cyanide complex catalyst. The total degree of unsaturation (unit: meq./g), i.e., an indicator in polyol of side reaction, is preferably 0.07 or less, even more preferably 0.05 or less, most preferably 0.04 or less, and for example, 0.001 or more.

Examples of the polytetramethylene ether polyol include polytetramethylene ether glycol, and to be specific, ring-opening polymerized product produced by cationic polymerization of tetrahydrofuran, and noncrystalline (amorphous) polytetramethylene ether glycol obtained by copolymerization of alkyl-substituted tetrahydrofuran, and the above-described dihydric alcohol with polymerization unit of tetrahydrofuran are used.

The amorphous (noncrystalline) means that it is liquid under normal temperature (25° C.).

The noncrystalline polytetramethylene ether glycol can be produced by, for example, as a copolymer (tetrahydrofuran/alkyl-substituted tetrahydrofuran (molar ratio)=15/85 to 85/15, number average molecular weight 500 to 4000, preferably 800 to 3500) of tetrahydrofuran and alkyl-substituted tetrahydrofuran (e.g., 3-methyltetrahydrofuran, etc.), and a copolymer (tetrahydrofuran/branched glycol (molar ratio)=15/85 to 85/15, number average molecular weight 500 to 4000, preferably 800 to 3500) of, for example, tetrahydrofuran and branched glycol (e.g., neopentyl glycol, etc.).

Examples of the polyester polyol include a polycondensation product obtained by allowing the above-described low-molecular-weight polyol and polybasic acid to react under known conditions.

Examples of the polybasic acid include oxalic acid, malonic acid, succinic acid, methylsuccinic acid, glutaric acid, adipic acid, 1,1-dimethyl-1,3-dicarboxypropane, 3-methyl-3-ethylglutaric acid, azelaic acid, sebacic acid, and other saturated aliphatic dicarboxylic acids (C 11 to 13); maleic acid, fumaric acid, itaconic acid, and other unsaturated aliphatic dicarboxylic acids; orthophthalic acid, isophthalic acid, terephthalic acid, toluenedicarboxylic acid, naphthalenedicarboxylic acid, and other aromatic dicarboxylic acids; hexahydrophthalic acid and other alicyclic dicarboxylic acids; dimer acid, hydrogenated dimer acid, het acid, and other carboxylic acids, and acid anhydrides derived from these carboxylic acids such as oxalic anhydride, succinic anhydride, maleic anhydride, phthalic anhydride, 2-alkyl (C 12 to C 18) succinic anhydride, tetrahydrophthalic anhydride, trimellitic anhydride, and hallides derived from carboxylic acids thereof such as oxalyl dichloride, adipoyl dichloride, and sebacoyl dichloride.

Examples of the polyester polyol include plant derived polyester polyols, to be specific, vegetable oil polyester polyols obtained by condensation reaction of hydroxycarboxylic acid such as hydroxyl group-containing vegetable oil fatty acid (e.g., castor oil fatty acid containing ricinoleic acid, hydrogenated castor oil fatty acid containing 12-hydroxystearic acid, etc.) using the above-described low-molecular-weight polyol as an initiator under known conditions.

Examples of the polyester polyol include polycaprolactone polyol, and polyvalerolactone polyol obtained by ring-opening polymerization of lactones such as ε-caprolactone, γ-valerolactone, etc. or lactides such as L-lactide, D-lactide using the above-described low-molecular-weight polyols (preferably, dihydric alcohol) as an initiator, and further lactone-based polyester polyols obtained by copolymerizing such a polycaprolactone polyol or polyvalerolactone polyol with the above-described dihydric alcohol.

Examples of the polycarbonate polyol include ring-opening polymerization product of ethylene carbonate using the above-described low-molecular-weight polyols (preferably, dihydric alcohol) as an initiator, and amorphous polycarbonate polyols obtained by copolymerization of dihydric alcohols such as 1,4-butanediol, 1,5-pentanediol, 3-methyl-1,5-pentanediol, and 1,6-hexanediol with ring-opening polymerization product.

Polyurethane polyols can be obtained as polyester polyurethane polyol, polyether polyurethane polyol, polycarbonate polyurethane polyol, or polyester polyether polyurethane polyol, by allowing polyester polyol, polyetherpolyol and/or polycarbonate polyol obtained as described above to react with polyisocyanate at an equivalent ratio (OH/NCO) of hydroxyl group (OH) to isocyanate group (NCO) of more than 1.

Examples of the epoxy polyol include epoxy polyols obtained by reaction of the above-described low-molecular-weight polyols with polyfunctional halohydrin such as epichlorohydrin, β-methylepichlorohydrin, etc.

Examples of the vegetable oil-based polyol include hydroxyl group-containing vegetable oils such as castor oil and coconut oil. For example, castor oil polyol, or ester-modified castor oil polyol produced by reaction of castor oil fatty acid with polyoxypropylene polyol.

Examples of polyolefin polyols include polybutadiene polyol, and a partially saponified ethylene-vinyl acetate copolymer.

Examples of the acrylic polyol include copolymers obtained by copolymerizing hydroxyl group-containing acrylate with a copolymerizable vinyl monomer copolymerizable with the hydroxyl group-containing acrylate.

Examples of the hydroxyl group-containing acrylate include 2-hydroxyethyl (meth)acrylate, hydroxypropyl (meth)acrylate, hydroxybutyl (meth)acrylate, 2,2-dihydroxymethylbutyl (meth)acrylate, polyhydroxyalkyl maleate and polyhydroxyalkyl fumarate.

Examples of the copolymerizable vinyl monomer include alkyl (meth)acrylates (of 1 to 12 carbon atoms) such as methyl (meth)acrylate, ethyl (meth)acrylate, propyl (meth)acrylate, isopropyl (meth)acrylate, butyl (meth)acrylate, isobutyl (meth)acrylate, s-butyl (meth)acrylate, t-butyl (meth)acrylate, pentyl (meth)acrylate, isopentyl (meth)acrylate, hexyl (meth)acrylate, isononyl (meth)acrylate, 2-ethylhexyl (meth)acrylate, and cyclohexyl acrylate; aromatic vinyl monomers such as styrene, vinyltoluene, and α-methylstyrene; vinyl cyanides such as (meth) acrylonitrile; vinyl monomers containing carboxyl groups such as (meth) acrylic acid, fumaric acid, maleic acid, and itaconic acid, or alkyl esters thereof; alkane polyol poly (meth)acrylates such as ethylene glycol di(meth)acrylate, butylene glycol di(meth)acrylate, hexanediol di(meth)acrylate, oligo-ethylene glycol di(meth)acrylate, trimethylol propane di(meth)acrylate, and trimethylol propane tri(meth)acrylate; and vinyl monomers containing isocyanate groups such as 3-(2-isocyanato-2-propyl)-α-methylstyrene.

The acrylic polyol can be obtained by copolymerizing these hydroxyl group-containing acrylates and copolymerizable vinyl monomers in the presence of a suitable solvent and a suitable polymerization initiator.

Examples of the silicone polyol include acrylic polyol in which as the copolymerizable vinyl monomer, for example, a silicone compound containing a vinyl group such as γ-methacryloxypropyltrimethoxysilane is blended in the above-described copolymerization of acrylic polyol.

Examples of the fluorine polyol include polyols in which fluorine atoms are introduced into at least a portion of the above-described high-molecular weight polyol (e.g., polyetherpolyol, polyesterpolyol, polyurethane polyol, etc.) by a known method. To be specific, for example, fluorine-containing polyetherpolyol (perfluoropolyetherpolyol), fluorine-containing polyesterpolyol, and fluorine-containing polyurethane polyol are used.

Examples of the fluorinepolyol also include acrylic polyol in which in the above-described acrylic polyol copolymerization, a fluorine compound containing a vinyl group is blended as the copolymerizable vinyl monomer.

Examples of the fluorine compound containing vinyl group include vinylidene fluoride (VdF), tetrafluoroethylene (TFE), hexafluoropropylene (HFP), chlorotrifluoroethylene (CTFE), vinylfluoride (VF), and perfluoro (alkylvinylether).

The fluorine polyol can be produced by copolymerization of; for example, a fluorine compound containing vinyl group such as TFE, a copolymerizable vinyl monomer, and a hydroxyl group-containing vinyl monomer.

The vinyl monomer-modified polyol can be obtained by allowing the above-described high-molecular weight polyol to react with a vinyl monomer.

These polyols (b-2) may be used singly or in combination of two or more.

For the polyol (b-2), preferably, polyetherpolyol is used, more preferably, polyoxyalkylene polyol is used.

The polyol (b-2) has a number average molecular weight of, for example, 300 or more, preferably 500 or more, more preferably 1000 or more, even more preferably 1500 or more, and for example, 15000 or less, preferably 10000 or less, more preferably 9000 or less, even more preferably 8000 or less.

When the polyol (b-2) has a number average molecular weight of more than the above-described upper limit value, viscosity of the polyurethane composition excessively increases, which may cause poor flowability. When the polyol (b-2) has a number average molecular weight of below the above-described lower limit value, improvement in the speed of increase in viscosity of the polyurethane composition becomes difficult, which may cause suppression of cell unification difficult. When the polyol (b-2) has a number average molecular weight of more than the above-described upper limit value or below the above-described lower limit value, improvement in physical properties (impact resilience, compression set, strength at break, tear strength to be described later) of the produced foam polyurethane material may be insufficient.

The polyol (b-2) has an average functionality of, for example, 1.5 or more, preferably 2 or more, and for example, 3 or less, preferably 2.5 or less, further preferably 2.0.

The polyol (b-2) has an average hydroxyl number of, for example, 10 mgKOH/g or more, preferably 15 mgKOH/g or more, and for example, 400 mgKOH/g or less, preferably 300 mgKOH/g or less, more preferably 100 mgKOH/g or less, even more preferably 50 mgKOH/g or less.

To prepare the isocyanate-terminated prepolymer (b), the polyisocyanate (b-1) and the polyol (b-2) are blended so that the isocyanate index (ratio of the isocyanate group concentration of polyisocyanate (b-1) relative to the hydroxyl group concentration of polyol (b-2) multiplied by 100, NCO concentration/hydroxyl group concentration×100) is, for example, more than 100, preferably 105 or more, and for example, 400 or less, preferably 350 or less, and the mixture is allowed to react. The isocyanate-terminated prepolymer (b) can be produced in this manner.

The reaction between the polyisocyanate (b-1) and the polyol (b-2) can be performed in conformity with a known method, and the reaction temperature is, for example, 50° C. or more, for example, 120° C. or less, preferably 100° C. or less. The reaction time is, for example, 0.5 hours or more, preferably 1 hour or more, and for example, 15 hours or more, preferably 10 hours or more.

In this reaction, as necessary, an organic solvent can also be added.

In this reaction, as necessary, a catalyst to be described later can also be added.

Furthermore, in this reaction, as necessary, free (unreacted) polyisocyanate and the organic solvent can be removed, for example, by a known removal methods such as distillation and extraction from the produced isocyanate group-terminated prepolymer (b).

The isocyanate-terminated prepolymer (b) has an isocyanate group content (isocyanate group-content ratio) of, for example, 0.3 mass % or more, preferably 0.35 mass % or more, more preferably 0.4 mass % or more, even more preferably 0.45 mass % or more, and for example, less than 5 mass %, preferably 4 mass % or less, even more preferably 3.5 mass % or less, further preferably 3 mass % or less.

The isocyanate group-content ratio can be determined by a known method such as titration with di-n-butylamine and FT-IR analysis.

When the isocyanate group-content ratio is more than the above-described upper limit value, improvement in speed of increase in viscosity of the polyurethane composition is difficult, which may cause suppression of cell unification to be difficult. When the isocyanate group-content ratio is below the above-described lower limit value, the polyurethane composition becomes excessively viscous, which may cause poor flowability.

The isocyanate-terminated prepolymer (b) is contained in an amount of, for example, 1 mass % or more, preferably 5 mass % or more, and for example, 25 mass % or less, preferably 15 mass % or less, in a total amount of the polyisocyanate (a) and the isocyanate-terminated prepolymer (b).

When it is contained more than the above-described upper limit value, the isocyanate group concentration decreases in the polyisocyanate component (polyisocyanate (a) and isocyanate-terminated prepolymer (b)), and therefore sufficient foaming may not be achieved. When it is contained below the above-described lower limit value, improvement in the speed of increase in viscosity of the polyurethane composition, and suppression of cell unification may become difficult.

Examples of the polyol (c) include the above-described high-molecular weight polyol and low-molecular-weight polyol.

For the polyol (c), preferably, polyetherpolyol, more preferably, polyoxyalkylene polyol is used.

The polyol (c) has a number average molecular weight of, for example, 500 or more, preferably 1000 or more, and for example, 10000 or less, preferably 9000 or less.

The polyol (c) has an average functionality of, for example, 2 or more, preferably 2.5 or more, and for example, 4 or less, preferably 3.5 or less.

The polyol (c) has an average hydroxyl number of, for example, 10 mgKOH/g or more, preferably 12 mgKOH/g or more, and for example, 450 mgKOH/g or less, preferably 400 mgKOH/g or less.

For the catalyst, a known catalyst that is generally used for production of foam polyurethane material may be used. Examples of such a catalyst include amine catalysts including tertiary amine compounds such as triethylamine, triethylenediamine, and N-methylmorpholine; quaternary ammonium salt compounds such as tetraethylhydroxylammonium; imidazole compounds such as imidazole and 2-ethyl-4-methylimidazole; inorganic tin compounds (tin salt of organic acid) such as tin acetate and tin octylate; organic metal catalyst including organic tin compounds such as dibutyltindilaurate, dibutyltinchloride, dimethyltindineodecanoate, and dimethyltindithioglycolate; bismuth compounds such as bismuth octylate and bismuth neodecanoate; organic lead compounds such as lead octylate and lead naphthenate; organic nickel compounds such as nickel naphthenate and nickel acetylacetonate; and organic zirconium compounds such as zirconium tetraacetylacetonate.

The catalyst can be used singly or in combination of a plurality of types.

When a plurality of types of catalyst are used in combination, preferably, an amine catalyst and an organic metal catalyst are used in combination.

The catalyst is blended relative to 100 parts by mass of the polyol (c) in an amount of, for example, 0.5 parts by mass or more, preferably 1 part by mass or more, and for example, 5 parts by mass or less, preferably 4 parts by mass or less.

The polyurethane composition may further contain a blowing agent and a foam stabilizer.

For the blowing agent, a known blowing agent generally used for production of foam polyurethane material may be used. Examples of such a blowing agent include water, and halogen-substituted aliphatic hydrocarbons such as trichlorofluoromethane, dichlorodifluoromethane, trichloroethane, trichloroethylene, tetrachloroethylene, methylene chloride, trichlorotrifluoroethane, dibromotetrafluoroethane, and carbon tetrachloride.

These blowing agents can be used singly or can be used in combination of two or more.

For the blowing agent, preferably, water is used singly.

The blowing agent is blended relative to 100 parts by mass of the polyol (c) in an amount of, for example, 0.3 parts by mass or more, preferably 0.5 parts by mass or more, and for example, 3 parts by mass or less, preferably 2 parts by mass or less.

For the foam stabilizer, a known foam stabilizer generally used for production of foam polyurethane material may be used. Examples thereof include silicone foam stabilizer such as L-568, L-580, L-590, L-598, L-600, L-620. L-635, L-638, L-650. L-680, L-682, SC-155, Y-10366, L-5309, L-5614, L-5617, L-5627, L-5639, L-5624, L-5690, L-5693, and L-5698 produced by Momentive Performance Materials Inc., F-607, F-606, F-242T, F-114, and F-348 produced by Shin-Etsu Chemical Co., Ltd., DC5598, DC5933, DC5609, DC5986, DC5950, DC2525, DC2585, DC6070, and DC3043 produced by Air Products and Chemicals, Inc., SZ-1919, SH-192, SH190, SZ-580, SRX 280A, SZ-584, SF2904, SZ-5740M, SZ-1142, and SZ-1959 produced by Dow Corning Toray Co., Ltd.

The foam stabilizer is blended relative to 100 parts by mass of the polyol (c) in an amount of, for example, 0.1 parts by mass or more, preferably 0.5 parts by mass or more, and for example, 3 parts by mass or less, preferably 2 parts by mass or less.

The polyurethane composition may contain, as necessary, a cross-linking agent, a stabilizer (antioxidant, ultraviolet ray absorber, light stabilizer, etc.), and a pigment.

The cross-linking agent is blended for purposes of, for example, improvement in impact resilience of foam polyurethane material, and examples thereof include alkanol amine.

Examples of the alkanolamine include polyalkanolamines including trialkanol amine (tri C 2 to 4 alkanolamine) such as trimethanolamine, triethanolamine, tripropanolamine, triisopropanolamine, and tributanolamine, and dialkanolamine (di C2 to 4 alkanolamine) such as diethanolamine, and monoethanolamine. Preferably, dialkanolamine is used.

For the cross-linking agent, for example, in addition to the above-described alkanolamine, low-molecular-weight alcohol and/or its alkylene oxide-added polyol, quadrivalent aliphatic amine, aliphatic and alicyclic secondary diamine (to be specific, JEFFLINK 754 (manufactured by Huntsman), CLEARLINK 1000 (manufactured by Dorf Ketal Chemicals), CLEARLINK 3000 (manufactured by Dorf Ketal Chemicals), ETHACURE 90 (manufactured by ALBEMARLE)) can also be used. For the low-molecular-weight alcohol, the above-described low-molecular-weight alcohols are used.

These cross-linking agents can be used singly or in combination of two or more.

The cross-linking agent is blended relative to 100 parts by mass of the polyol (c) in an amount of for example, 1 part by mass or more, preferably 3 parts by mass or more, more preferably 5 parts by mass or more, and for example, 20 parts by mass or less, preferably 15 parts by mass or less.

Examples of the antioxidant include hindered phenol compounds (to be specific, IRGANOX 1135, IRGANOX 245, IRGANOX 1076, IRGANOX 1726, IRGANOX 1520 L, all manufactured by BASF, to be specific, ADK STAB AO-80 manufactured by ADEKA), organic phosphorus compounds (to be specific, JP-302, JP-308. JP-308E, JP-310, JP-312 L, JP-333E, JP-3180, JPS-312, JPP-13R, JP-318E, all manufactured by Johoku Chemical Co. Ltd., to be specific, IRGAFOS 38, IRGAFOS P-EPQ, all manufactured by BASF, to be specific, ADK STABPEP-4C, ADK STABPEP-8, ADK STAB 1500, ADK STAB 3010, all manufactured by manufactured by ADEKA), thioether compounds (to be specific, IRG ANOX PS800FL, IRGANOX PS802FL, all manufactured by BASF, to be specific, ADK STAB AO-412S, ADK STAB AO-503, all manufactured by ADEKA, to be specific, Yoshitomi DLTP, Yoshitomi DSTP, and Yoshitomi DMTP, all manufactured by API CORPORATION), and hydroxylamine compounds (to be specific, IRGASTAB FS 042 manufactured by BASF).

The antioxidant is blended relative to 100 parts by mass of the polyol (c) in an amount of, for example, 0.1 parts by mass or more, preferably 0.2 parts by mass or more, and for example, 2 parts by mass or less, preferably 1.5 parts by mass or less.

Examples of the ultraviolet ray absorber include, a benzotriazole compound (to be specific, TINUVIN 571, TINUVIN 213, TINUVIN 234, and TINUVIN P, all manufactured by BASF), a formamidine compound (to be specific, Zikasorb R, Zikasorb BS, ZIKA-FA02, ZIKA-FUA, ZIKA-FUV, ZIKA-UVS 3, and ZIKA-UVS 4, all manufactured by ZIKO).

The ultraviolet ray absorber is blended relative to 100 parts by mass of the polyol (c) in an amount of, for example, 0.1 parts by mass or more, preferably 0.2 parts by mass or more, and for example, 2 parts by mass or less, preferably 1.5 parts by mass or less.

Examples of the light stabilizer include a hindered amine compound (to be specific, TINUVIN 765, TINUVIN 770, and TINUVIN 622 LD, all manufactured by BASF, to be specific, ADK STABLA-52, ADK STABLA-57, ADK STABLA-63P, ADK STABLA-68, ADK STABLA-72, ADK STABLA-82, and ADK STABLA-87, all manufactured by ADEKA).

The light stabilizer is blended relative to 100 parts by mass of the polyol (c) in an amount of, for example, 0.1 parts by mass or more, preferably 0.2 parts by mass or more, and for example, 2 parts by mass or less, preferably 1.5 parts by mass or less.

The stabilizer (antioxidant, ultraviolet ray absorber, light stabilizer, etc.) in total is blended relative to 100 parts by mass of the polyol (c) in an amount of, for example, 0.3 parts by mass or more, preferably 0.5 parts by mass or more, and for example, 5 parts by mass or less, preferably 4 parts by mass or less.

Next, a method for producing a foam polyurethane material is described.

To produce a foam polyurethane material, the polyol (c) is blended with, as necessary, a catalyst (to be specific, amine catalyst), a blowing agent, a foam stabilizer, a cross-linking agent, and a stabilizer, and the mixture is stirred to prepare a premix.

Then, to produce a foam polyurethane material, the obtained premix is blended with an isocyanate-terminated prepolymer (b) and a catalyst (to be specific, organic metal catalyst), and the mixture is stirred.

Then, the premix is further blended with a polyisocyanate (a) in an amount such that the isocyanate index (ratio of the isocyanate group concentration of the polyisocyanate (a) and isocyanate-terminated prepolymer (b) relative to the hydroxyl group concentration of the polyol (c) multiplied by 100, NCO concentration/hydroxyl group concentration× 100) is, for example, 80 or more, preferably 90 or more, and for example, 110 or less, preferably 105 or less, more preferably less than 100, and the mixture is stirred to prepare a polyurethane composition.

Then, to produce a foam polyurethane material, the obtained polyurethane composition is allowed to foam chemically using a blowing agent by a foaming method such as, for example, slab method, mold method, spray method, or to foam mechanically without using a blowing agent by a foaming method such as mechanical frothing. Preferably, it is allowed to foam chemically using a blowing agent.

In the continuous phase of the polyurethane composition in the process of foaming, the polyisocyanate (a) is allowed to react with the polyol (c), and at the same time, the isocyanate-terminated prepolymer (b) is allowed to react with the polyol (c).

At this time, the continuous phase quickly increase its viscosity as the isocyanate-terminated prepolymer (b) reacts with the polyol (c) to produce a high-molecular weight polymer.

Then, the continuous phase with increased viscosity allows cell in the polyurethane composition to stably disperse, which suppresses cell unification.

Then, while the cell unification is suppressed, reaction and foaming of the polyisocyanate (a), the isocyanate-terminated prepolymer (b), and the polyol (c) are completed.

A foam polyurethane material containing a large number of micro cells can be produced in this manner.

The produced foam polyurethane material contains the polyurethane elastomer and the polyurethane foam, and they are roughly classified by an apparent core density to be described later.

The produced foam polyurethane material has a cell number (measured by the method described later in Examples) per unit length (1 inch) of, for example, 20 or more, preferably 25 or more, more preferably 30 or more, even more preferably 35 or more, further more preferably 37 or more, and for example, 100 or less, preferably 80 or less, more preferably 50 or less.

The number of the cells per unit length (1 inch) is an indicator of roughness/smoothness (size) of the cell in foam polyurethane material.

The obtained foam polyurethane material has an apparent core density (measured in conformity with JIS K 7222 (2005)) of, for example, 0.01 g/cm$^3$ or more, and for example, 0.5 g/cm$^3$ or less.

The apparent core density is, when the foam polyurethane material is polyurethane elastomer, for example, 0.1 g/cm$^3$ or more, for example, 0.5 g/cm$^3$ or less, preferably 0.3 g/cm$^3$ or less, more preferably 0.2 g/cm$^3$ or less, further more preferably 0.15 g/cm$^3$ or less.

The apparent core density is, when the foam polyurethane material is polyurethane foam, for example, 0.01 g/cm$^3$ or more, for example, less than 0.1 g/cm$^3$, preferably 0.08 g/cm$^3$ or less, more preferably 0.07 g/cm$^3$ or less.

The obtained foam polyurethane material has an impact resilience (measured in conformity with JIS K 6400-3 (2012)) of, for example, 65% or more, preferably 68% or more, more preferably 70% or more, further preferably 80% or more, and for example, 95% or less.

The obtained foam polyurethane material has a compression set (measured in conformity with JIS K 6400-4 (2012)) of, for example, 0.1% or more, and for example, 15% or less, preferably 10% or less, more preferably 5% or less.

The obtained foam polyurethane material has a strength at break (measured in conformity with JIS K 6400-5 (2012)) of for example, 115 kPa or more, preferably 125 kPa or more, more preferably 130 kPa or more, even more preferably 140 kPa or more, and for example, 800 kPa or less.

The obtained foam polyurethane material has a tear strength (measured in conformity with JIS K 6400-5 (2012)) of, for example, 0.47 kN/m or more, preferably 0.5 kN/m or more, more preferably 0.55 kN/m or more, even more preferably 0.6 kN/m or more, and for example, 3.0 kN/m or less.

The obtained foam polyurethane material has a Δb (measured in conformity with the method in Examples to be described later) before and after ultraviolet ray irradiation of, for example, 20 or less, preferably 10 or less, and for example, 1 or more.

The Δb is an indicator of UV discoloration resistance of foam polyurethane material, and when it is more than the above-described upper limit, it shows that the foam polyurethane material has a low UV discoloration resistance.

The foam polyurethane material is produced by allowing a polyurethane composition containing an isocyanate-terminated prepolymer (b) containing 0.3 mass % or more and less than 5 mass % of an isocyanate group to react and foam.

Therefore, when the polyurethane composition is allowed to react and foam, the isocyanate-terminated prepolymer (b) is allowed to react with the polyol (c), which allows for improvement in the speed of increase in viscosity of the polyurethane composition in the process of reaction. In this manner, the cell unification can be suppressed in the polyurethane composition in the process of reaction.

This is probably because use of a specific prepolymer (isocyanate-terminated prepolymer (b)) causes resin components with high degree of polyaddition to be present at the same time, increase in melt tensile strength due to the resin components suppresses interconnection of cells, and generation of large cells is suppressed. Meanwhile, it is also assumed that the increase in melt tensile strength does not excessively suppress generation and growth of cell.

As a result, microcells can be increased inside the foam polyurethane material, and lightweight and high impact resilience can be achieved.

Next, use of the produced foam polyurethane material is described.

When the produced foam polyurethane material is obtained by slab method, it is formed into a desired shape and size by, for example, cutting. When it is obtained by molding method, it is foamed in a mold, so that it is formed into a desired shape and size.

Thus obtained molded articles are used in, for example, sporting goods including shoes midsole (portion between inner sole and outer sole), inner sole, outer sole, shoes cushioning member, shock absorbing material for helmet, and shock absorbing material for grip tape; headphone member; gasket member for civil engineering work material; cushion material for packing material, pillow, mattress, sheet cushion, sealing material, sound isolation flooring material; apparel products such as brassiere, brassiere pads, brassiere cups, and shoulder pads; bicycles and mobility member; cushioning materials for robots; caregiving products; and cushioning materials for electric and electronic products.

EXAMPLES

Next, the present invention is described based on Examples and Comparative Examples. However, the present invention is not limited to Examples below. The "parts" and "%" are based on mass unless otherwise specified. The specific numerical values of mixing ratio (content ratio), physical property value, and parameter used in the following can be replaced with upper limit values (numerical values defined with "or less" or "below") or lower limit values (numerical values defined with "or more" or "above") of corresponding numerical values in mixing ratio (content ratio), physical property value, and parameter described in "DESCRIPTION OF EMBODIMENTS" above.

<Description of Materials>

A. Polyisocyanate
(1) 1,4-bis(isocyanatomethyl) cyclohexane (1,4-BIC, synthesized in accordance with Production Example 3 of WO2009/51114, purity (measured with gas chromatography) 99.9%, trans/cis ratio (mol basis)=86/14)
(2) 1,3-bis(isocyanatomethyl) cyclohexane (1,3-BIC, trade name: TAKENATE 600, manufactured by Mitsui Chemicals, Inc.)
(3) Xylylene diisocyanate (XDI, trade name: TAKENATE 500, manufactured by Mitsui Chemicals, Inc.)
(4) Diphenylmethane diisocyanate (MDI-LL, trade name: Cosmonate MDI-LL, liquid type, manufactured by Mitsui Chemicals & SKC Polyurethanes Inc.)
(5) Isophoronediisocyanate (IPDI, trade name: VESTANAT IPDI, manufactured by Evonik Degussa Japan Co., Ltd.)

B. Polyol
(1) ED-28 (bifunctional polyoxyalkylene polyol of ethylene oxide propylene oxide copolymer, trade name: ACTCOL ED-28, number average molecular weight: 4000, average hydroxyl number: 28.1 mgKOH/g, manufactured by Mitsui Chemicals & SKC Polyurethanes Inc.)
(2) PTG-L3500 (noncrystalline polytetramethylene ether glycol, trade name: PTG-L3500, number average molecular weight: 3500, average hydroxyl number=32.1 mgKOH/g, manufactured by Hodogaya Chemical Co., LTD.)
(3) Polyol A (polyoxypropylene glycol, obtained by addition polymerization of dipropylene glycol with propylene oxide using phosphazenium compound as a catalyst by the method described in Example 2 of patent publication 3905638, number average molecular weight: 500, average hydroxyl number: 225 mgKOH/g)
(4) Polyol B (polyoxypropylene glycol, obtained by addition polymerization of dipropylene glycol with propylene oxide using phosphazenium compound as a catalyst by the method described in Example 2 of patent publication 3905638, number average molecular weight: 10000, average hydroxyl number: 11 mgKOH/g)
(5) EP-901P (polyoxy-1,2-alkylene polyol having average functionality of 3, trade name: ACTCOL EP-901P, number average molecular weight: 7000, average hydroxyl number: 24 mgKOH/g, manufactured by Mitsui Chemicals & SKC Polyurethanes Inc.)
(6) EP-950P (polyoxy-1,2-alkylene polyol having average functionality of 3, trade name: ACTCOL EP-950P, number average molecular weight: 5000, average hydroxyl number: 34 mgKOH/g, manufactured by Mitsui Chemicals & SKC Polyurethanes Inc.)

C. Cross-Linking Agent
Diethanolamine (manufactured by Mitsui Chemicals, Inc.)

D. Catalyst
(1) Amine catalyst (33% dipropylene glycol solution of triethylenediamine, trade name: DABCO 33 LV, manufactured by Air Products and Chemicals, Inc.)
(2) Organic metal catalyst (dibutyltin (IV) dilaurate (dibutyltin dilaurate (DBTDL)), manufactured by Nitto Kasei Co., Ltd.)

E. Foam stabilizer
(1) Silicone foam stabilizer 1 (trade name: Y10366, manufactured by MOMENTIVE PERFORMANCE MATERIALS INC.)
(2) Silicone foam stabilizer 2 (trade name; L-5614, manufactured by MOMENTIVE PERFORMANCE MATERIALS INC.)

F. Stabilizer
(1) Antioxidant (hindered phenol compound, trade name: IRGANOX 1135, manufactured by BASF Japan Ltd.)
(2) Ultraviolet ray absorber (benzotriazole compound, trade name: TINUVIN 571, manufactured by BASF Japan Ltd.)
(3) Light stabilizer (hindered amine compound, trade name: TINUVIN 765, manufactured by BASF Japan Ltd.)

<Production of Foam Polyurethane Material>
(1) Synthesis of Isocyanate-Terminated Prepolymer (b)

A four-neck flask was charged with polyisocyanate (b-1) and polyol (b-2) by parts by mass shown in Table 1 or 2 so that the isocyanate index (ratio of the isocyanate group concentration of polyisocyanate (b-1) relative to the hydroxyl group concentration of polyol (b-2) multiplied by 100) was as shown in Table 1 and Table 2, and 10 ppm of an organic metal catalyst (DBTDL) was added relative to a total amount of the polyisocyanate (b-1) and polyol (b-2). The mixture was stirred under nitrogen flow and the temperature controlled to 80° C., thereby producing an isocyanate-terminated prepolymer (b) of Synthesis Examples.

The isocyanate group content of the obtained isocyanate-terminated prepolymer (b) is shown in Table 1 and Table 2.

(2) Production of Foam Polyurethane Material (2-1) Examples 1 to 5, 7 to 23, and Comparative Examples 1 to 4

A polyol (c), a blowing agent (ion-exchange water), and a silicone foam stabilizer (Y10366) of parts by mass shown in Tables 3 to 5 below were blended with 5 parts by mass of a cross-linking agent (diethanolamine), 1 part by mass of an amine catalyst (DABCO 33 LV), 0.3 parts by mass of antioxidant (IRGANOX 1135), 0.8 parts by mass of ultraviolet ray absorber (TINUVIN 571), and 0.8 parts by mass of light stabilizer (TINUVIN 765), and the mixture was stirred to be homogeneous in a laboratory having a temperature of 23° C. and a relative humidity of 55%, thereby preparing a resin premix.

Separately, the isocyanate-terminated prepolymer (b) in an amount shown in Tables 3 to 5 relative to a total of the polyisocyanate (a) and isocyanate-terminated prepolymer (b), and 0.5 parts by mass of an organic metal catalyst (DBTDL) were added to the resin premix, and the mixture was stirred to be homogeneous in a laboratory having a temperature of 23° C. and a relative humidity of 55%.

Thereafter, a polyisocyanate (a) was added to the mixture so that the isocyanate index (ratio of the isocyanate group concentration of the polyisocyanate (a) and isocyanate-terminated prepolymer (b) relative to the hydroxyl group concentration of polyol (c) multiplied by 100) was 95, and they were stirred with a hand-mixer (number of revolution 5000 rpm) for 15 seconds, thereby preparing a polyurethane composition.

Then, immediately after the preparation, the obtained polyurethane composition was quickly put in a wooden box to foam.

Thereafter, it was allowed to stand in an oven having a temperature of 80° C. for one day.

In this manner, the foam polyurethane material of Examples and Comparative Examples was obtained.

(2-2) Example 6

A foam polyurethane material was produced in the same manner as in Example 1 described above, except that ion-exchange water as the blowing agent was not blended, L-5614 was used instead of Y10366 as the silicone foam stabilizer, and the polyurethane composition was allowed to foam by mechanical frothing (stirred using tabletop mixer equipped with whipper stirrer (manufactured by Aicohsha Manufacturing Co., Ltd., trade name: KENMIX Chef K300), under nitrogen atmosphere, with revolution speed of 180 rpm for 30 seconds).

(2-3) Example 24

A foam polyurethane material was prepared in the same manner as in Example 4, except that the ion-exchange water was added by 1.5 parts by mass. Hysteresis loss was calculated by the method to be described later as polyurethane foam for mattress, and as a result, the hysteresis loss was 18%.

<Evaluation>

(1) Occurrence/Nonoccurrence of Sinking

The polyurethane composition immediately after foaming (that is, immediately before allowing to stand in an oven of 80° C.) and the foam polyurethane material after allowed to stand in the oven of 80° C. for one day after foaming were visually observed, and occurrence or nonoccurrence of shrinkage was determined. The results are shown in Tables 3 to 5.

(2) Cell Homogeneity

Cell homogeneity of the obtained foam polyurethane material was visually observed, and evaluated with a scale of 5 to 1, 5 being the most homogeneous, and 1 being rough cells including large cell based on the criteria below. The results are shown in Tables 3 to 5.

(Evaluation Criteria)

5: Cell diameter is mostly uniform.
4: Cell diameter is mostly uniform, but includes a few cells having a largely different diameter.
3: Cell diameter is inhomogeneous, but unified cell is rarely found.
2: Cell diameter is inhomogeneous and some unified cells are found.
1: Mostly unified cells and lacks homogeneity.

(3) Number of the Cells Per Unit Length (1 Inch) (Unit: Cell/Inch)

First, black ink was lightly applied on a smooth cut plane of the foam polyurethane material.

Then, the surface to which the black ink was applied was magnified using a CCD camera (manufactured by Keyence Corporation, microscope VHX-900) to 20 times, and was shown on a display.

A straight line equivalent to 1 inch of the foam polyurethane material was also shown on the image shown on the display, and the number of the cells on which the straight line passed through was counted visually as the number of the cells per unit length. The results are shown in Tables 3 to 5. FIG. 1 shows correlation between the isocyanate group content of the isocyanate-terminated prepolymer (b) and the number of the cells per unit length (1 inch) of the obtained foam polyurethane material.

(4) Apparent Core Density (Unit: g/Cm$^3$)

Figure 2:
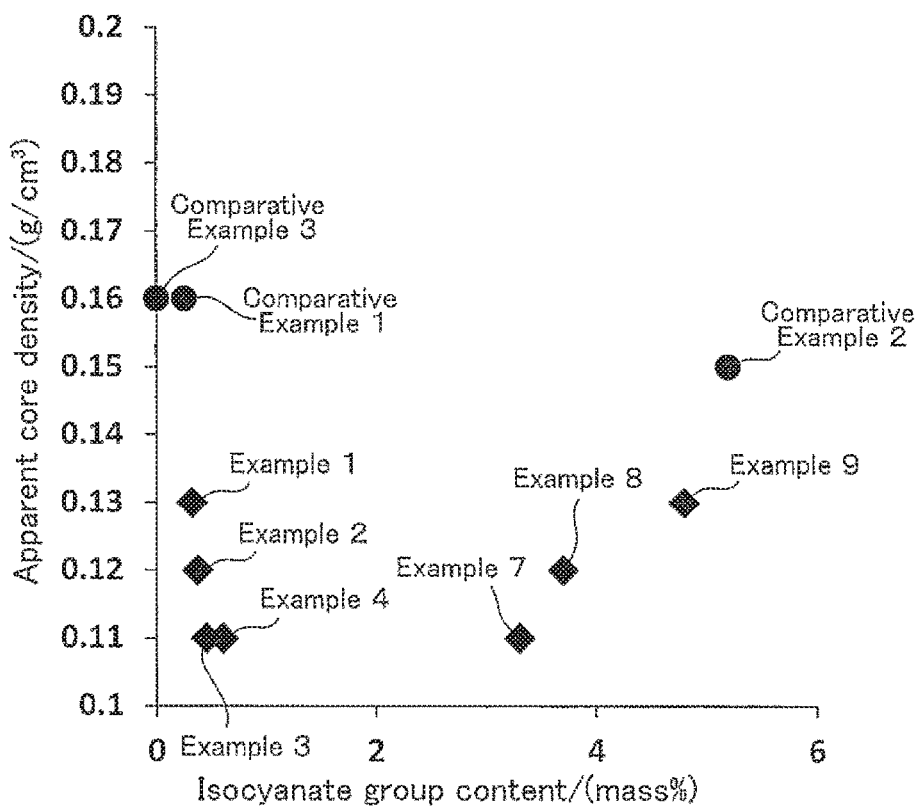
FIG. 2 is a correlation diagram showing correlation between the isocyanate group content of the isocyanate-terminated prepolymer (b) and the apparent core density of the obtained foam polyurethane material.

A rectangular parallelepiped having a size of 10×10×5 cm was cut out from the center portion (core) of the obtained foam polyurethane material to make a measurement sample, and thereafter, apparent density of the measurement sample was measured in accordance with JIS K7222 (2005). In this manner, apparent core density of foam polyurethane material was evaluated. The results are shown in Tables 3 to 5. FIG. 2 shows correlation between the isocyanate group content of the isocyanate-terminated prepolymer (b) and apparent core density of the obtained foam polyurethane material.

(5) Impact Resilience

Figure 3:
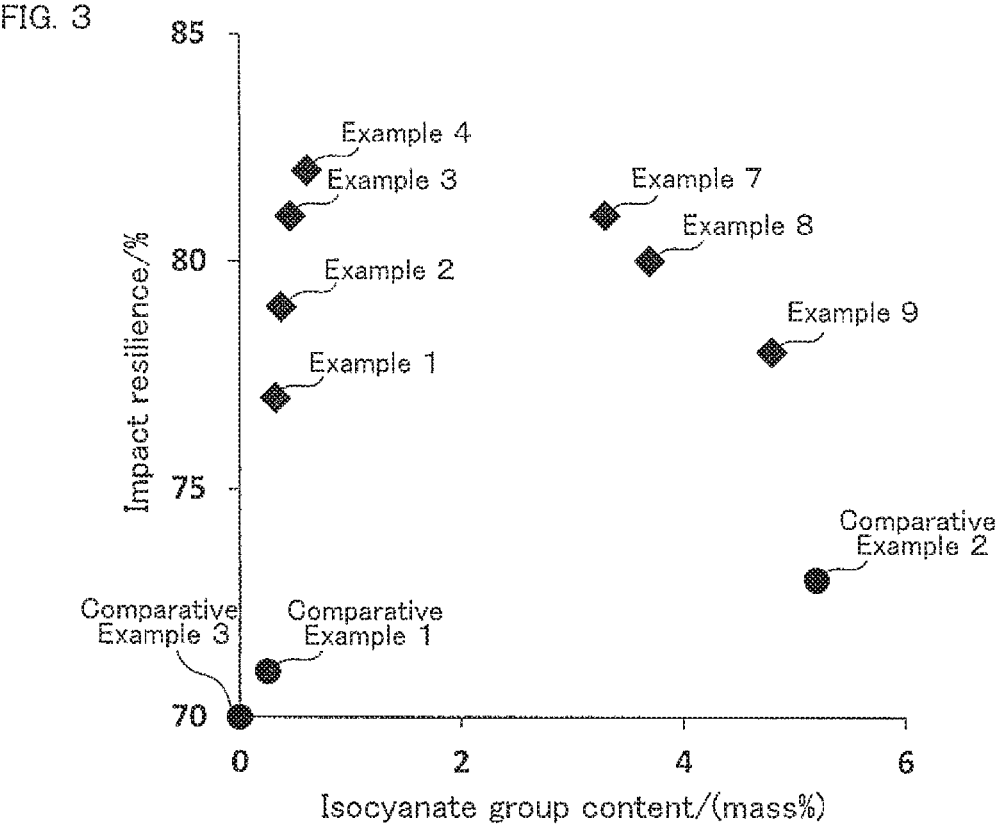
FIG. 3 is a correlation diagram showing correlation between the isocyanate group content of the isocyanate-terminated prepolymer (b) and the impact resilience of the obtained foam polyurethane material.

A rectangular parallelepiped having a size of 10×10×5 cm was cut out from a center portion of the obtained foam polyurethane material to make a measurement sample, and thereafter, impact resilience of the measurement sample was measured in accordance with JIS K6400-3 (2012). The results are shown in Tables 3 to 5. FIG. 3 shows correlation between the isocyanate group content of the isocyanate-terminated prepolymer (b) and impact resilience of the obtained foam polyurethane material.

(6) Compression Set (Unit: %)

Figure 4:
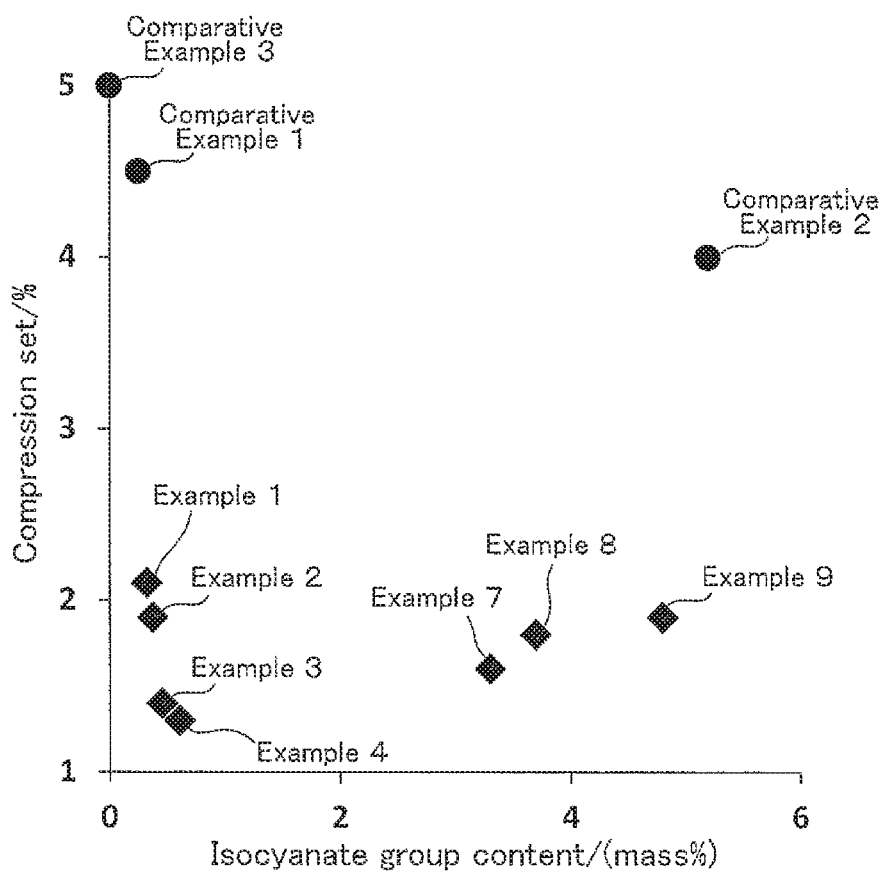
FIG. 4 is a correlation diagram showing correlation between the isocyanate group content of the isocyanate-terminated prepolymer (b) and the compression set of the obtained foam polyurethane material.

A rectangular parallelepiped having a size of 5×5×2.5 cm was cut out from the obtained foam polyurethane material to make a measurement sample, and allowed to stand under 50% compression and controlled temperature of 70° C. for 22 hours in accordance with method A of JIS K6400-4 (2012). Thereafter, the compression was released, displacement after 30 minutes was measured, and compression set was calculated. The results are shown in Tables 3 to 5. FIG. 4 shows correlation between the isocyanate group content of the isocyanate-terminated prepolymer (b) and compression set of the obtained foam polyurethane material.

(7) Strength at Break (Unit: kPa)

Figure 5:
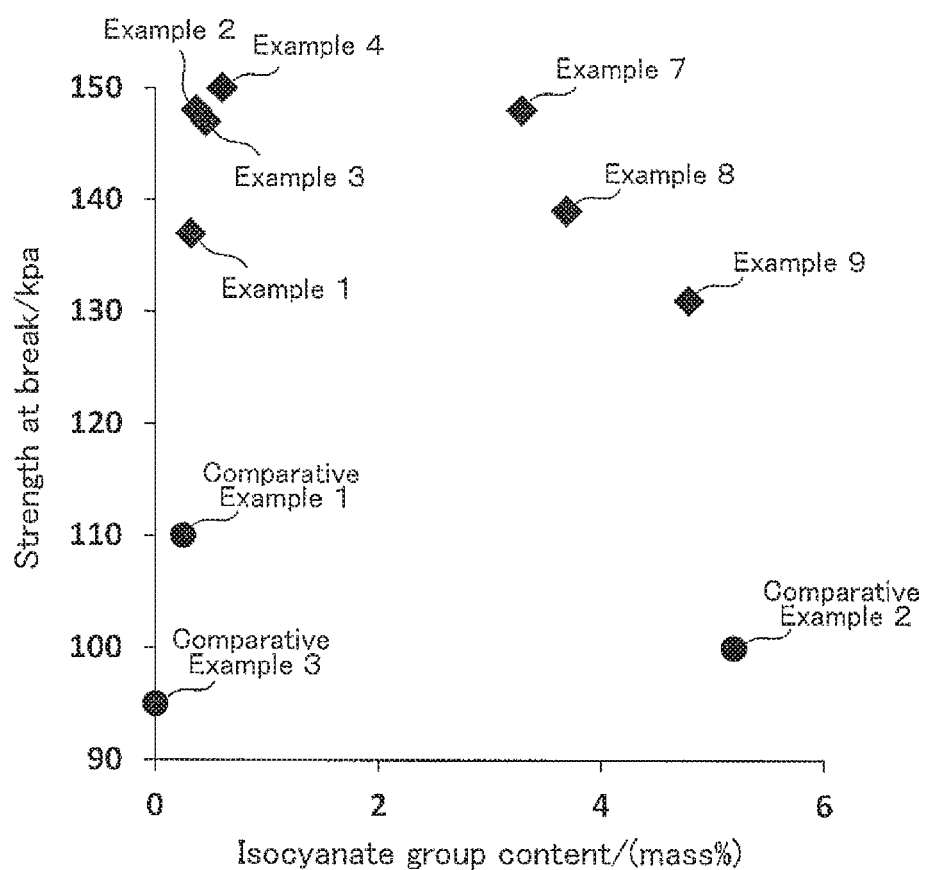
FIG. 5 is a correlation diagram showing correlation between the isocyanate group content of the isocyanate-terminated prepolymer (b) and the strength at break of the obtained foam polyurethane material.

A slice of 10 mm thickness was cut out from a center portion of the obtained foam polyurethane material, and a measurement sample was made using a JIS-1 dumbbell. Thereafter, strength at break of the measurement sample was measured in accordance with JIS K6400-5 (2012). The results are shown in Tables 3 to 5. FIG. 5 shows correlation between the isocyanate group content of the isocyanate-terminated prepolymer (b) and strength at break of the obtained foam polyurethane material.

(8) Tear Strength (Unit: kN/m)

Figure 6:
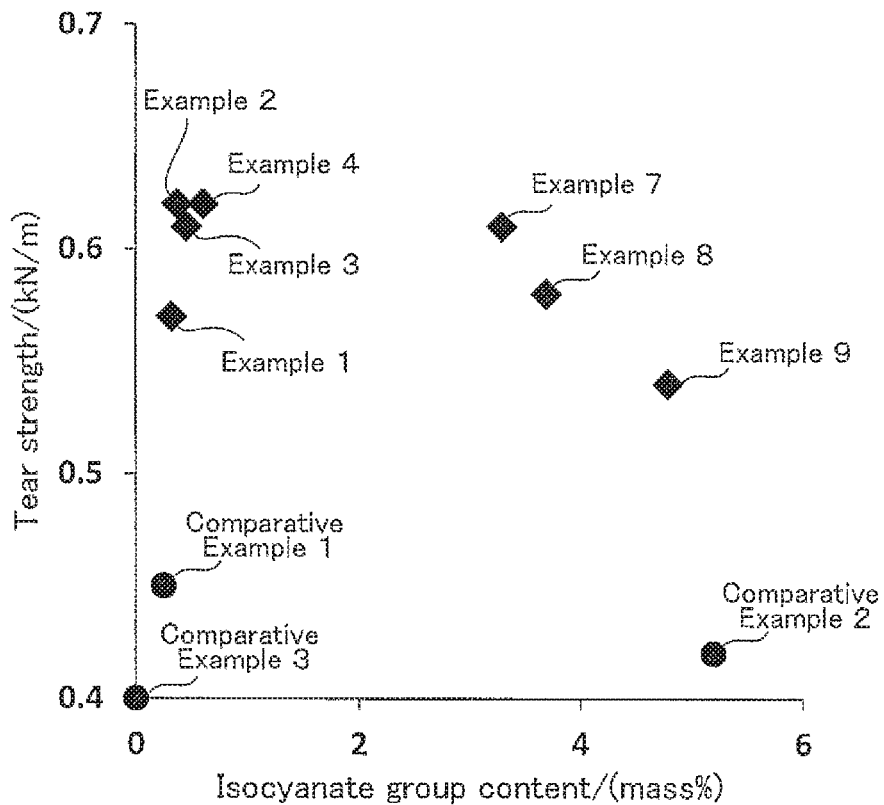
FIG. 6 is a correlation diagram showing correlation between the isocyanate group content of the isocyanate-terminated prepolymer (b) and the tear strength of the obtained foam polyurethane material.

A slice of 10 mm thickness was cut out from a center portion of the obtained foam polyurethane material, and a measurement sample was made using a JIS-B dumbbell. Thereafter, tear strength of the measurement sample was measured in accordance with method B of JIS K6400-5 (2012). The results are shown in Tables 3 to 5. FIG. 6 shows correlation between the isocyanate group content of the isocyanate-terminated prepolymer (b) and tear strength of the obtained foam polyurethane material.

(9) UV Discoloration Resistance

A rectangular parallelepiped having a size of 30×40×10 mm was cut out from the obtained foam polyurethane material to prepare a measurement sample, and thereafter, the measurement sample was irradiated with ultraviolet ray having a short wavelength (wavelength 270 to 720 nm) using a QUV weathering tester equipped with a ultraviolet ray fluorescent lamp for 24 hours.

Δb (amount of change in value b) of the foam polyurethane material before and after the irradiation was measured using a color meter (manufactured by Tokyo Denshoku CO., LTD., Color Ace MODEL TC-1). The results are shown in Tables 3 to 5.

The Δb is an indicator of UV discoloration resistance of foam polyurethane material.

(10) Hysteresis Loss (Unit: %)

A rectangular parallelepiped having a size of 10×10×5 cm was cut out from a center portion of the foam polyurethane material to prepare a measurement sample, a hysteresis curve was measured in conformity with method E of JIS K6400-2(2012) with 75% compression, and a hysteresis loss was calculated.

TABLE 1

| | | | Synthesis Example 1 | Synthesis Example 2 | Synthesis Example 3 | Synthesis Example 4 | Synthesis Example 5 | Synthesis Example 6 | Synthesis Example 7 |
|---|---|---|---|---|---|---|---|---|---|
| | Prepolymer (b) | | A | B | C | D | E | F | G |
| Composition | Polyisocyanate (b-1) (parts by mass) | 1,4-BIC | 5.6 | 5.8 | 6.0 | 6.3 | 13.5 | 14.7 | 17.9 |
| | | 1,3-BIC | — | — | — | — | — | — | — |
| | | IPDI | — | — | — | — | — | — | — |
| | | XDI | — | — | — | — | — | — | — |
| | Polyol (b-2) (parts by mass) | ED-28 | 100 | 100 | 100 | 100 | 100 | 100 | 100 |
| | | PTG-L3500 | — | — | — | — | — | — | — |
| | | Polyol A (Mn = 500) | — | — | — | — | — | — | — |
| | | Polyol B (Mn = 10000) | — | — | — | — | — | — | — |
| | Isocyanate index | | 116 | 119 | 123 | 130 | 278 | 302 | 369 |
| | Isocyanate group content (mass %) | | 0.32 | 0.37 | 0.45 | 0.6 | 3.3 | 3.7 | 4.8 |

| | | | Synthesis Example 8 | Synthesis Example 9 | Synthesis Example 10 | Synthesis Example 11 | Synthesis Example 12 | Synthesis Example 13 |
|---|---|---|---|---|---|---|---|---|
| | Prepolymer (b) | | H | I | J | K | L | M |
| Composition | Polyisocyanate (b-1) (parts by mass) | 1,4-BIC | — | — | — | 7.0 | 40.0 | 3.4 |
| | | 1,3-BIC | 6.3 | — | — | — | — | — |
| | | IPDI | — | 7.3 | — | — | — | — |
| | | XDI | — | — | 6.1 | — | — | — |
| | Polyol (b-2) (parts by mass) | ED-28 | 100 | 100 | 100 | — | — | — |
| | | PTG-L3500 | — | — | — | 100 | — | — |
| | | Polyol A (Mn = 500) | — | — | — | — | 100 | — |
| | | Polyol B (Mn = 10000) | — | — | — | — | — | 100 |
| | Isocyanate index | | 130 | 131 | 130 | 127 | 105 | 174 |
| | Isocyanate group content (mass %) | | 0.6 | 0.6 | 0.6 | 0.6 | 0.6 | 0.6 |

TABLE 2

| | | | Synthesis Example 14 | Synthesis Example 15 |
|---|---|---|---|---|
| | Prepolymer (b) | | N | O |
| Composition | Polyisocyanate (b-1) (parts by mass) | 1,4-BIC | 5.4 | 19.2 |
| | | 1,3-BIC | — | — |
| | | IPDI | — | — |
| | | XDI | — | — |
| | Polyol (b-2) (parts by mass) | ED-28 | 100 | 100 |
| | | PTG-L3500 | — | — |
| | | Polyol A (Mn = 500) | — | — |
| | | Polyol B (Mn = 10000) | — | — |
| | Isocyanate index | | 113 | 395 |
| | Isocyanate group content (mass %) | | 0.26 | 5.2 |

TABLE 3

| | | | Example 1 | Example 2 | Example 3 | Example 4 | Example 5 | Example 6 |
|---|---|---|---|---|---|---|---|---|
| Polyisocyanate (a) (parts by mass) | 1,4-BIC | | 27.3 | 27.3 | 27.3 | 27.2 | 28.9 | 17.0 |
| | 1,3-BIC | | — | — | — | — | — | — |
| | XDI | | — | — | — | — | — | — |
| | MDI-LL | | — | — | — | — | — | — |

TABLE 3-continued

|  |  |  |  |  |  |  |  |
|---|---|---|---|---|---|---|---|
| Prepolymer (b) | Synthesis Example | A | B | C | D | D | D |
|  | Isocyanate group content (mass %) | 0.32 | 0.37 | 0.45 | 0.6 | 0.6 | 0.6 |
|  | Amount added (mass %) | 8.5 | 8.5 | 8.5 | 8.5 | 8.5 | 8.5 |
|  | Prepolymer (b) percentage relative to total of Polyisocyanate (a) and Prepolymer (b) |  |  |  |  |  |  |
| Polyol (c) | EP-901P | 100 | 100 | 100 | 100 | — | 100 |
| (parts by mass) | EP-950P | — | — | — | — | 100 | — |
| Blowing agent (parts by mass) | Ion exchange water | 1 | 1 | 1 | 1 | 1 | — |
| Silicone foam stabilizer | Y10366 | 1 | 1 | 1 | 1 | 1 | — |
| (parts by mass) | L-5614 | — | — | — | — | — | 1 |
| Evaluation | Occurrence/Nonoccurrence of sinking | Not occurred | Not occurred | Not occurred | Not occurred | Not occurred | Not occurred |
|  | Cell homogeneity | 4 | 4~5 | 5 | 5 | 5 | 5 |
|  | Number of cells per unit length (cell/inch) | 35 | 36 | 37 | 37 | 40 | 80 |
|  | Apparent core density g/cm$^3$ | 0.13 | 0.12 | 0.11 | 0.11 | 0.11 | 0.3 |
|  | Impact resilience % | 77 | 79 | 81 | 82 | 81 | 77 |
|  | Compression set % | 2.1 | 1.9 | 1.4 | 1.3 | 1.5 | 2.5 |
|  | Strength at break kPa | 137 | 148 | 147 | 150 | 145 | 120 |
|  | Tear strength kN/m | 0.57 | 0.62 | 0.61 | 0.62 | 0.6 | 0.5 |
|  | UV discoloration resistance ⊿ b | 8.1 | 7.9 | 8.1 | 7.8 | 7.9 | 8.1 |

|  |  | Example 7 | Example 8 | Example 9 | Example 10 | Example 11 | Example 12 |
|---|---|---|---|---|---|---|---|
| Polyisocyanate (a) | 1,4-BIC | 26.7 | 26.6 | 26.4 | — | — | — |
| (parts by mass) | 1,3-BIC | — | — | — | 27.2 | — | — |
|  | XDI | — | — | — | — | 26.4 | — |
|  | MDI-LL | — | — | — | — | — | 40.7 |
| Prepolymer (b) | Synthesis Example | E | F | G | D | D | D |
|  | Isocyanate group content (mass %) | 3.3 | 3.7 | 4.8 | 0.6 | 0.6 | 0.6 |
|  | Amount added (mass %) | 8.5 | 8.5 | 8.5 | 8.5 | 8.7 | 5.8 |
|  | Prepolymer (b) percentage relative to total of Polyisocyanate (a) and Prepolymer (b) |  |  |  |  |  |  |
| Polyol (c) | EP-901P | 100 | 100 | 100 | 100 | 100 | 100 |
| (parts by mass) | EP-950P | — | — | — | — | — | — |
| Blowing agent (parts by mass) | Ion exchange water | 1 | 1 | 1 | 1 | 1 | 1 |
| Silicone foam stabilizer | Y10366 | 1 | 1 | 1 | 1 | 1 | 1 |
| (parts by mass) | L-5614 | — | — | — | — | — | — |
| Evaluation | Occurrence/Nonoccurrence of sinking | Not occurred | Not occurred | Not occurred | Not occurred | Not occurred | Not occurred |
|  | Cell homogeneity | 5 | 5 | 5 | 5 | 5 | 5 |
|  | Number of cells per unit length (cell/inch) | 38 | 33 | 30 | 38 | 37 | 36 |
|  | Apparent core density g/cm$^3$ | 0.11 | 0.12 | 0.13 | 0.12 | 0.12 | 0.12 |
|  | Impact resilience % | 81 | 80 | 78 | 80 | 78 | 77 |
|  | Compression set % | 1.6 | 1.8 | 1.9 | 2.3 | 2.2 | 2.9 |
|  | Strength at break kPa | 148 | 139 | 131 | 126 | 121 | 120 |
|  | Tear strength kN/m | 0.61 | 0.58 | 0.54 | 0.55 | 0.51 | 0.47 |
|  | UV discoloration resistance ⊿ b | 8.1 | 8.3 | 8.1 | 8.5 | 15 | 19 |

TABLE 4

|  |  | Example 13 | Example 14 | Example 15 | Example 16 | Example 17 | Example 18 |
|---|---|---|---|---|---|---|---|
| Polyisocyanate (a) | 1,4-BIC | 27.2 | 27.2 | 27.2 | 27.2 | 27.2 | 27.3 |
| (parts by mass) | 1,3-BIC | — | — | — | — | — | — |
|  | XDI | — | — | — | — | — | — |
|  | MDI-LL | — | — | — | — | — | — |
| Prepolymer (b) | Synthesis Example | H | I | J | K | D | D |
|  | Isocyanate group content (mass %) | 0.6 | 0.6 | 0.6 | 0.6 | 0.6 | 0.6 |
|  | Amount added (mass %) | 8.5 | 8.5 | 8.5 | 8.5 | 8.5 | 0.5 |
|  | Percentage of Prepolymer (b) relative to total of Polyisocyanate (a) and Prepolymer (b) |  |  |  |  |  |  |
| Polyol (c) | EP-901P | 100 | 100 | 100 | 100 | 100 | 100 |
| (parts by mass) | EP-950P | — | — | — | — | — | — |
| Blowing agent (parts by mass) | Ion exchange water | 1 | 1 | 1 | 1 | 1 | 1 |
| Silicone foam stabilizer | Y10366 | 1 | 1 | 1 | 1 | — | 1 |
| (parts by mass) | L-5614 | — | — | — | — | — | — |

TABLE 4-continued

| Evaluation | Occurrence/Nonoccurrence of sinking | | Not occurred | Not occurred | Not occurred | Not occurred | Not occurred | Slight sinking |
|---|---|---|---|---|---|---|---|---|
| | Cell homogeneity | | 5 | 4 | 4 | 5 | 4 | 5 |
| | Number of cells per unit length (cell/inch) | | 37 | 31 | 32 | 37 | 29 | 30 |
| | Apparent core density | g/cm³ | 0.12 | 0.13 | 0.13 | 0.12 | 0.13 | 0.14 |
| | Impact resilience | % | 81 | 75 | 77 | 79 | 80 | 78 |
| | Compression set | % | 2.3 | 3.1 | 2.8 | 1.8 | 2.2 | 2.2 |
| | Strength at break | kPa | 128 | 121 | 122 | 147 | 135 | 133 |
| | Tear strength | kN/m | 0.61 | 0.52 | 0.49 | 0.62 | 0.57 | 0.55 |
| | UV discoloration resistance | ⊿ b | 8.2 | 8.7 | 12 | 8.2 | 8.1 | 7.9 |

| | | | Example 19 | Example 20 | Example 21 | Example 22 | Example 23 | Example 24 |
|---|---|---|---|---|---|---|---|---|
| Polyisocyanate (a) (parts by mass) | | 1,4-BIC | 27.3 | 27.0 | 27.0 | 27.2 | 27.2 | 32.4 |
| | | 1,3-BIC | — | — | — | — | — | — |
| | | XDI | — | — | — | — | — | — |
| | | MDI-LL | — | — | — | — | — | — |
| Prepolymer (b) | Synthesis Example | | D | D | D | L | M | D |
| | Isocyanate group content (mass %) | | 0.6 | 0.6 | 0.6 | 0.6 | 0.6 | 0.6 |
| | Amount added (mass %) | | 1.5 | 23 | 27 | 8.5 | 8.5 | 8.5 |
| | Percentage of Prepolymer (b) relative to total of Polyisocyanate (a) and Prepolymer (b) | | | | | | | |
| Polyol (c) (parts by mass) | | EP-901P | 100 | 100 | 100 | 100 | 100 | 100 |
| | | EP-950P | — | — | — | — | — | — |
| Blowing agent (parts by mass) | | Ion exchange water | 1 | 1 | 1 | 1 | 1 | 1.5 |
| Silicone foam stabilizer (parts by mass) | | Y10366 | 1 | 1 | 1 | 1 | 1 | 1 |
| | | L-5614 | — | — | — | — | — | — |
| Evaluation | Occurrence/Nonoccurrence of sinking | | Not occurred | Not occurred | Slight sinking | Slight sinking | Slight sinking | Slight sinking |
| | Cell homogeneity | | 5 | 4~5 | 4 | 4 | 5 | 5 |
| | Number of cells per unit length (cell/inch) | | 33 | 38 | 35 | 32 | 33 | 38 |
| | Apparent core density | g/cm³ | 0.13 | 0.13 | 0.15 | 0.14 | 0.14 | 0.06 |
| | Impact resilience | % | 77 | 77 | 76 | 75 | 77 | 82 |
| | Compression set | % | 1.8 | 1.7 | 2.3 | 2.5 | 2.6 | 1.5 |
| | Strength at break | kPa | 140 | 141 | 130 | 138 | 139 | 138 |
| | Tear strength | kN/m | 0.59 | 0.57 | 0.53 | 0.52 | 0.53 | 0.57 |
| | UV discoloration resistance | ⊿ b | 8.1 | 8.2 | 8.1 | 8.2 | 7.9 | 7.9 |

TABLE 5

| | | | Comparative Example 1 | Comparative Example 2 | Comparative Example 3 | Comparative Example 4 |
|---|---|---|---|---|---|---|
| Polyisocyanate (a) (parts by mass) | | 1,4-BIC | 27.3 | 26.3 | 27.4 | — |
| | | 1,3-BIC | — | — | — | — |
| | | XDI | — | — | — | 26.5 |
| | | MDI-LL | — | — | — | — |
| Prepolymer (b) | Synthesis Example | | N | O | Not added | Not added |
| | Isocyanate group content (mass %) | | 0.25 | 5.2 | | |
| | Amount added (mass %) | | 8.5 | 8.5 | | |
| | Percentage of Prepolymer (b) relative to total of Polyisocyanate (a) and Prepolymer (b) | | | | | |
| Polyol (c) (parts by mass) | | EP-901P | 100 | 100 | 100 | 100 |
| | | EP-950P | — | — | — | — |
| Blowing agent (parts by mass) | | Ion exchange water | 1 | 1 | 1 | 1 |
| Silicone foam stabilizer (parts by mass) | | Y10366 | 1 | 1 | 1 | 1 |
| | | L-5614 | — | — | — | — |
| Evaluation | Occurrence/Nonoccurrence of sinking | | A little sinking | Slight sinking | A little sinking | A little sinking |
| | Cell homogeneity | | 2 | 3 | 1 | 2 |
| | Number of cells per unit length (cell/inch) | | 22 | 18 | 14 | 11 |
| | Apparent core density | g/cm³ | 0.16 | 0.15 | 0.16 | 0.18 |
| | Impact resilience | % | 71 | 73 | 70 | 63 |
| | Compression set | % | 4.5 | 4 | 5 | 5.7 |
| | Strength at break | kPa | 110 | 100 | 95 | 65 |
| | Tear strength | kN/m | 0.45 | 0.42 | 0.4 | 0.36 |
| | UV discoloration resistance | ⊿ b | 8.3 | 8.2 | 8.1 | 16 |

While the illustrative embodiments of the present invention are provided in the above description, such is for illustrative purpose only and it is not to be construed as limiting in any manner. Modification and variation of the present invention that will be obvious to those skilled in the art is to be covered by the following claims.

INDUSTRIAL APPLICABILITY

The molded articles made of the foam polyurethane material of the present invention are used for, for example, sporting goods including shoes midsole (portion between inner sole and outer sole), inner sole, outer sole, shoes cushioning member, shock absorbing material for helmet, and shock absorbing material for grip tape; headphone member; gasket member for civil engineering work material; cushion material for packing material, pillow, mattress, sheet cushion, sealing material, sound isolation flooring material; apparel products such as brassiere, brassiere pads, brassiere cups, and shoulder pads; bicycles and mobility member; cushioning materials for robots; caregiving products; and cushioning materials for electric and electronic products.

The invention claimed is:

1. A foam polyurethane material, wherein the foam polyurethane material is a reaction-foaming-product of a composition containing a polyisocyanate (a), an isocyanate-terminated prepolymer (b) containing 0.3 mass % or more and less than 5 mass % of an isocyanate group, a polyol (c), and a catalyst,
    the isocyanate-terminated prepolymer (b) is a reaction product of a polyisocyanate (b-1) and a polyol (b-2) which is different from the polyol (c),
    the polyisocyanate (b-1) is bis(isocyanatomethyl) cyclohexane, isophoronediisocyanate, or xylylene diisocyanate,
    0.5 mass % or more and 27 mass % or less of the isocyanate-terminated prepolymer (b) is contained in a total amount of the polyisocyanate (a) and the isocyanate-terminated prepolymer (b), and
    wherein the foam polyurethane material has an impact resilience measured in accordance with JIS K6400-3 (2012) of 65% or more.

2. The foam polyurethane material according to claim 1, wherein the isocyanate-terminated prepolymer (b) contains 0.4 mass % or more and 3.5 mass % or less of the isocyanate group.

3. The foam polyurethane material according to claim 1, wherein 1 mass % or more and 25 mass % or less of the isocyanate-terminated prepolymer (b) is contained in a total amount of the polyisocyanate (a) and the isocyanate-terminated prepolymer (b).

4. The foam polyurethane material according to claim 1, wherein
    the polyol (b-2) has a number average molecular weight of 1000 or more and 9000 or less.

5. The foam polyurethane material according to claim 1, wherein
    the polyisocyanate (b-1) is bis(isocyanatomethyl) cyclohexane.

6. The foam polyurethane material according to claim 1, wherein
    the polyisocyanate (a) is at least one selected from the group consisting of aliphatic polyisocyanate, alicyclic polyisocyanate, and araliphatic polyisocyanate.

7. The foam polyurethane material according to claim 1, wherein the foam polyurethane material has an apparent core density measured in conformity with JIS K 7222 (2005) of 0.5 g/cm$^3$ or less.

8. The foam polyurethane material according to claim 1, wherein
    the polyol (b-2) has an average functionality of 2, and
    the polyol (c) includes a polyol having an average functionality of 3.0.

9. A molded article made of the foam polyurethane material according to claim 1.

10. The molded article according to claim 9, wherein the molded article is a shoe midsole.

11. A method for producing the foam polyurethane material according to claim 1, the method including
    reacting and foaming, the composition containing the polyisocyanate (a), the isocyanate-terminated prepolymer (b), the polyol (c), and the catalyst.

* * * * *